Patented Feb. 13, 1951

2,541,816

UNITED STATES PATENT OFFICE 2,541,816

QUATERNARY AMMONIUM PENTACHLOROPHENATES

Sivert N. Glarum, Ardmore, and Alva L. Houk, Philadelphia, Pa., assignors to Rohm & Haas Company, Philadelphia, Pa., a corporation of Delaware No Drawing. Application September 11, 1943, Serial No. 502,049

7 Claims. (Cl. 260—567.5)

This invention deals with quaternary ammonium compounds having as an anion a pentachlorophenate group. It further deals with methods whereby these compounds may be prepared.

We have found that quaternary ammonium compounds of this invention may be prepared, according to a preferred procedure, by reacting by heating together a tertiary amine in which at least two N-substituents are short chained (i. e., not over four carbon atoms each) with the methyl or benzyl ether of pentachlorophenol. The resulting products are

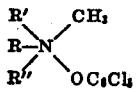

and

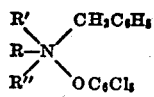

wherein R is an aliphatic, alicyclic, or arylaliphatic group and R' and R'' are the same or different short chained groups such as methyl, ethyl, propyl, or butyl. R' and R'' may also together form a divalent group which jointly with the nitrogen atom gives a heterocycle. Typical divalent groups are —CH$_2$CH$_2$CH$_2$CH$_2$CH$_2$— and —CH$_2$CH$_2$OCH$_2$CH$_2$—, which, taken with the nitrogen, yield piperidino- or morpholinogroups.

Typical groups represented by R in the above formula are methyl, ethyl, propyl, isopropyl, butyl, isobutyl, amyl, hexyl, octyl, decyl, undecenyl, dodecyl, cetyl, octadecyl, octadecenyl, butoxymethyl, butoxyethyl, butoxybutyl, benzyl, methylbenzyl, tert.-butylbenzyl, phenoxyethyl, chlorophenoxyethyl, nitrophenoxyethyl, naphthoxyethyl, phenoxyethoxyethyl, 1,1,3,3-tetramethylbutylphenoxyethoxyethyl, phenoxypropyl, phenoxypropoxypropyl, decylphenoxyethyl, cyclohexyl, methylcyclohexyl, etc. When R is a group of more than six carbon atoms, the quaternary ammonium compounds exhibit capillary activity.

By the preferred method, a tertiary amine of the formula

is heated with an ether of the formula $$R_1OC_6Cl_5$$

wherein $R_1$ is methyl or benzyl, at a temperature between about 80° C. and about 180° C. with or without an organic solvent under normal, reduced, or increased pressure. The compound which is formed in the reaction may be purified by stripping off a volatile unreacted component of the reaction mixture, by treating with an adsorbent such as charcoal, by crystallizing, or by following other conventional purification steps.

While the above method constitutes a preferred one, quaternary ammonium compounds having a pentachlorophenate anion may also be prepared by metathesis between a quaternary ammonium salt of a strong acid, such as chloride, bromide, or sulfate, and a soluble salt of pentachlorophenol, such as sodium or potassium pentachlorophenate. The metathesis may take place in an aqueous system or in a system with an organic solvent and the salts formed by methathesis separated.

Yet another method of preparation of quaternary ammonium pentachlorophenates, although one of somewhat limited scope because of lack of availability of starting materials, is the direct reaction of a quaternary ammonium hydroxide and pentachlorophenol.

By the above methods there may be obtained practically any type of quaternary ammonium pentachlorophenate. These are all new compounds having valuable properties which make them useful as disinfectants, bactericides, fungicides, textile assistants, and finishing agents, wetting agents, emulsifiers, etc.

Those new compounds of the general formula

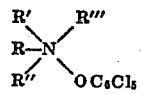

are of particular interest, R, R', and R'' having the same significance as shown above and R''' being any monovalent group, including not only the methyl and benzyl groups from the preferred method of preparation but also such groups as ethyl, propyl, butyl, allyl, methallyl, carbethoxymethyl, carboxyethyl, dodecyloxymethyl, octyloxymethyl, or other monovalent aliphatic, alicyclic, heterocyclic, or arylaliphatic group. Furthermore, the groups R', R'', and R''' may together form a trivalent unsaturated group which together with the nitrogen form a heterocycle as in the pyridinium or quinolinium pentachlorophenates, such as cetyl pyridinium pentachlorophenate.

The quaternary ammonium compounds of this invention are readily absorbed from their solutions by textile fibers, particularly by fibrous cellulosic materials, and are tenaciously retained thereby. Fibers so treated resist attack by fungi and bacteria very effectively. Fabrics, whether woven, knitted, or felted, can be protected thereby against rotting and tendering. When the compound used for treating fibrous products has more than six carbon atoms in the substituent R, the compound is fairly well retained. Compositions containing ¼% or more of one of the compounds of this invention are particularly useful for mildewproofing cotton fabrics such as canvas or Osnaburg, jute fabrics, fabrics of other cellulosic fibers, or other types of fibers, including wool, which may be exposed to conditions favoring the growth of fungi thereon.

This invention is illustrated by the following examples of the preparation of quaternary ammonium salts having as an anion a pentachlorophenate group.

*Example 1*

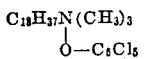

A mixture of 84 parts of pentachloroanisole and 96 parts of octadecyl dimethylamine was stirred at 140° C. for nine hours. Titration of the amine showed that 99% had reacted. The solid product was crystallized from methyl ethyl ketone. By analysis the product was found to contain 28.05% of chlorine. Theory is 30.7%.

*Example 2*

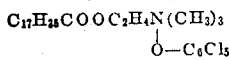

A mixture of 38 parts of dimethylaminoethyl stearate and 28 parts of pentachloroanisole was stirred at 150° C. for twelve hours. Titration of the amine showed that reaction was 90% complete.

*Example 3*

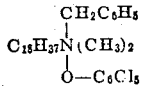

A mixture of 35 parts of octadecyl dimethylamine and 36 parts of pentachlorophenylbenzyl ether was heated at 170° C. for four hours. The product crystallized on cooling. It is very slightly soluble in water but soluble in alcohol.

*Example 4*

The above compound was also prepared by the following method: Solutions were prepared by dissolving 212 parts of octadecyl dimethyl benzyl ammonium chloride in 1500 parts of water and adding thereto a solution of 144 parts of sodium pentachlorophenate in 1500 parts of water. An oily precipitate formed which was separated and dried in vacuo. The yield was 280 parts of solid product.

*Example 5*

A solution of octadecyl trimethyl ammonium pentachlorophenate (described above) was prepared by mixing a solution of 70.5 parts of octadecyl trimethyl ammonium chloride in 200 parts of water with a solution of 58 parts of sodium pentachlorophenate in 244 parts of water. A thick paste resulted which could be diluted to a clear aqueous solution.

*Example 6*

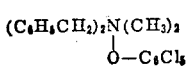

A solution was prepared by dissolving 66 parts of pentachlorophenol in a mixture of 125 parts of a 2.0 normal solution of dimethyl dibenzyl ammonium hydroxide, 285 parts of water, and 320 parts of ethanol. The resulting solution contained 15% quaternary ammonium pentachlorophenate.

The preferred compounds of this invention are those chloropenhates in which there occurs one N-substituent of twelve to eighteen carbon atoms in an aliphatic hydrocarbon group and two other N-substituents are methyl groups. These compounds in one or two per cent. solutions are especially effective in preventing growth of molds and are well retained on fabrics under conditions where leaching may occur.

In general, the compounds of this invention are soluble in water or in mixtures of water and an organic solvent miscible therewith, such as alcohol or acetone. Many compounds are also soluble in organic solvents themselves, such as naphtha, benzene, alcohol, acetone, or the like.

The compounds are conveniently applied to fabrics from solutions, particularly aqueous solutions. After excess solution has been removed therefrom, the fabrics are dried. Fabrics treated in this way are highly resistant to mildewing and tendering under conditions of severe exposure. In confirmation of this, there are here presented results of mildew tests with a variety of compounds falling within the above general formula.

The tests were made under carefully controlled conditions and were designed to show not only growth or lack of growth of specific fungi but also the effect on the cloth itself. In general, the test methods used followed those prescribed in Tentative Specifications of the Corps of Engineers, United States Army, T-1452, as amended June 10, 1941, and January 12, 1942.

A small strip of treated cloth was sterilized under fifteen pounds steam pressure and placed in a test tube containing sterile agar with nutrient salts. The agar was then inoculated with one-half to three-quarters of a milliliter of a suspension of spores of a selected fungus. The tube was stoppered with a cotton plug and placed in an incubator maintained at 90° F. for a week. Observations were then made as to growth or lack of growth. In many cases, the tensile strength of the strip was determined.

The tests were compared against control strips. Strips of the original fabric, but untreated with mildewproofing agent, were tested along with strips of treated fabric to make sure that copious growth of fungi occurred. Also, blank strips were given all of the handling and passed through all of the procedural steps except that these strips were not inoculated with spores in order to determine what effect the procedure itself and the chemical agents might have. Another set of tests was also made with strips which were leached in a stream of tap water for twenty-four hours. These were squeezed, sterilized, and tested by the procedure described above.

Details of typical tests are given below:

A. Cotton Osnaburg was passed through a 1% solution of $C_{18}H_{37}(CH_3)_3NOC_6Cl_5$ in water, squeezed to 100% take-up of solution, and dried. Strips of this treated fabric were then tested with *Metarrhizium sp.*, *Chaetomium globosum*, and *Aspergillus niger*, respectively. No growth occurred in one week on any strip. No growth occurred on strips which were leached. The strips all showed excellent retention of tensile strength.

Tests were repeated on a 48 x 48 cotton sheeting. Whether unleached or leached, the strips showed no growth and retained their tensile strength well.

Controls with strips subjected to agar but lacking the quaternary ammonium pentachlorophenate supported a large, flourishing growth and with Metarrhizium and Chaetomium lost all tensile strength. Controls subjected to procedural steps, but not inoculated with spores, retained essentially their initial breaking strength. These results were repeated in each of the following tests.

B. A 1% solution of

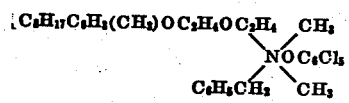

in denatured alcohol was applied to both Osnaburg and 48 x 48 sheeting. The cloth was squeezed to leave about a 100% take-up and dried. Strips of the two types of cloth were tested as above with Metarrhizium. No growth whatsoever occurred on unleached specimens, and the tensile strength of these strips was fully retained. The leached strips, however, permitted some growth. The compound used here has considerable solubility, and it should also be noted that leach-fastness was generally not so good for cloth treated from solvent solutions as from water.

Controls treated with denatured alcohol without quaternary compound and dried supported a vigorous growth when inoculated and lost all breaking strength. Controls not inoculated retain essentially their original strength.

C. The compound

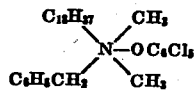

was tested at two levels of concentration, 1% and 2%, in alcoholic solutions. No growth occurred on strips of unleached Osnaburg with Metarrhizium sp., *Chaetomium globosum*, or *Aspergillus niger*. A trace of growth was noted on leached strips with *Aspergillus niger* and Chaetomium, but the tensile strength was little changed. Tests with 48 x 48 cotton sheeting in general confirmed the findings with Osnaburg, although there was an increased tendency for leaching of agent to occur with this fabric and a concomitant tendency for the fabric to be attacked.

D. The compound $C_{12}H_{25}(CH_3)_3N-OC_6Cl_5$ was applied from a 1% solution in alcohol. Strips of both Osnaburg and sheeting were tested against Metarrhizium sp., and such compound was found to prevent the growth of fungus thereon. The strips retained at least 90% of their strength during the test.

E. A 1% aqueous solution of $$C_6H_5CH_2(CH_3)_3NOC_6Cl_5$$

was applied to both Osnaburg and 48 x 48 sheeting, as in previous tests. Strips tested against Metarrhizium sp., showed no growth and retained practically their full strength. The impregnated but leached strips were resistant to the growth of this organism but lost somewhat in tensile strength.

F. A 1% solution of $(C_6H_5CH_2)_2(CH_3)_2NOC_6Cl_5$ was made in a mixture of three parts of water and one part of alcohol. This was applied to both Osnaburg and sheeting in the usual way. Unleached strips were completely resistant to the growth of Metarrhizium sp. Leached strips of impregnated Osnaburg, while permitting a rather copious growth, retained at least 90% of their tensile strength.

G. A 1% solution of

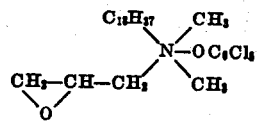

in alcohol was applied to both Osnaburg and 48 x 48 cotton sheeting, the excess solution removed to leave 100% take-up of solution, and the impregnated cloths dried. No growth of Metarrhizium sp. was observed on test strips and at least 90% of the tensile strength was retained by these test strips. Some growth occurred on leached strips with the same fungus with concomitant partial loss of strength.

H. A 1% solution of

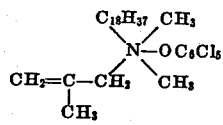

in alcohol was used as in the previous example. Neither leached nor unleached strips of 48 x 48 cotton sheeting supported any growth of Metarrhizium sp. There was no growth on unleached Osnaburg, but slight growth on leached Osnaburg.

I. Tests on wool suiting were made with a product prepared by metathesis from equal parts by weight of p-tert.-octyl-phenoxyethoxyethyl dimethyl benzyl ammonium chloride, sodium pentachlorophenate, and alcohol. A solution of 1.5% of the crude reaction product was made in water and applied to the suiting, which was then squeezed to a 100% take-up, and dried. Against Metarrhizium sp. unleached pieces permitted but a trace of growth and leached pieces but slight growth while, on control samples, a copius growth occurred. These results were duplicated with *Chaetomium globosum*.

The new quaternary ammonium pentachlorophenates are highly effective mildew resisting compounds for use on textile fibers. They are superior to the quaternary ammonium salts of strong acids and to pentachlorophenol or its alkali salts, particularly in that the new compounds resist leaching and are effective where other organic compounds fail. Their capacity to combat growth on nitrogenous fibers is unusual and of considerable value.

We claim:

1. Quaternary ammonium compounds of the formula

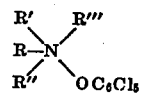

wherein R is a member of the class consisting of (a) aliphatic and arylaliphatic hydrocarbon groups containing up to eighteen carbon atoms, (b) aryloxy-saturated-aliphatic-groups wherein the oxy linkage is the sole functional group and the aliphatic portion contains at least one alkylene group of two to three carbon atoms, linked to the nitrogen, (c) alkoxyalkyl groups wherein the alkoxy portion contains up to twelve carbon atoms and the alkyl portion contains up to four carbon atoms, and (d) beta-alkanoyloxyethyl groups in which the alkanoyl group contains not over eighteen carbon atoms, R''' is a member of the class consisting of aliphatic hydrocarbon groups of not over four carbon atoms and the benzyl group, and R' and R" are lower alkyl groups containing one to four carbon atoms.

2. Quaternary ammonium compounds of the formula

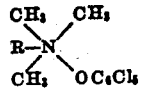

wherein R is an aliphatic hydrocarbon group containing twelve to eighteen carbon atoms.

3. Quaternary ammonium compounds of the formula

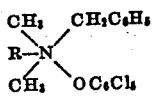

wherein R is an aliphatic hydrocarbon group of twelve to eighteen carbon atoms.

4. A quaternary ammonium compound of the formula

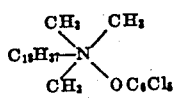

5. A quaternary ammonium compound of the formula

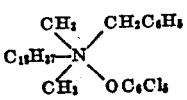

6. Quaternary ammonium compounds of the formula

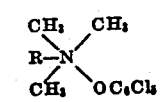

wherein R is an alkyl group containing at least eight and not more than eighteen carbon atoms.

7. Quaternary ammonium compounds of the formula

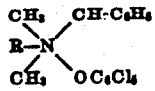

wherein R is an aliphatic hydrocarbon group containing at least 8 and not more than eighteen carbon atoms.

SIVERT N. GLARUM.
ALVA L. HOUK.

REFERENCES CITED

The following references are of record in the file of this patent:

UNITED STATES PATENTS

| Number | Name | Date |
| --- | --- | --- |
| 2,186,739 | Metcalf | Jan. 9, 1940 |
| 2,260,967 | Bruson | Oct. 28, 1941 |
| 2,271,378 | Searle | Jan. 27, 1942 |
| 2,293,826 | Iselin | Aug. 25, 1942 |
| 2,344,886 | Lieber | Mar. 1, 1944 |

OTHER REFERENCES

Chemical Abst., vol. 16, p. 77 (1922).
Chem. Abst., vol. 24 (1930), p. 4517.
Sidgwick's Organic Chemistry of Nitrogen (1937), p. 27.
Chemical Abst., vol. 33, p. 6267 (1939).
Chem. Abst., vol. 35 (1941), pp. 6341 and 7560.
Furry et al.: "Mildew-Resistant Treatment on Fabrics," Industrial and Engineering Chemistry, April 1941, pp. 538-545.